United States Patent Office 2,753,612
Patented July 10, 1956

2,753,612
PROCESS OF FORMING MAGNESIA REFRACTORY FURNACE BOTTOMS

Hobart M. Kraner, Bethlehem, Pa., assignor to Bethlehem Steel Company, a corporation of Pennsylvania No Drawing. Application January 12, 1951, Serial No. 205,835

2 Claims. (Cl. 25—155.5)

This application is a continuation-in-part of my co-pending application, now abandoned, Serial No. 727,289, filed February 7, 1947, for improvements in magnesia refractory.

This invention relates in general to basic refractory materials, and in particular to magnesia refractories for open hearth bottoms and the like.

As magnesia (MgO) is the best basic refractory known, from the standpoint of resistance to high temperatures and to slags which occur in open hearths, it is standard practice in steel making to make the hearths of basic open hearth furnaces of magnesite bricks, and upon these bricks a heavy surface of crushed or granular calcined magnesite is either sintered or rammed into place.

In installing a rammed magnesite bottom, a mixture of sized magnesite grains and a bonding agent such as sodium silicate, clay, open hearth slag or borax is moistened with water and tamped into place to a depth of about 6 to 15 inches although thinner or thicker layers are sometimes used. The heat of the furnace is then turned on and the bottom fired to a temperature of from 2800° to 3000° F. or thereabouts to dry and harden and sinter the same. This procedure saves at least 48 hours per bottom in down time over the method of installing a sintered bottom (in which thin layers consisting of a mixture of magnesite and basic open hearth slag are successively sintered in place). However the firing process has the serious defect of causing the rammed material to shrink considerably, forming large cracks in the bottom which may allow molten metal to seep through when the furnace is put into use. The intention is to obtain a monolithic layer, but this is not easily accomplished, as the rammed dry material weighs about 155 pounds per cubic foot whereas the fired material weighs 170 to 190 pounds per cubic foot, and this change in density represents a shrinkage of the rammed bottom. Accordingly, to complete a rammed bottom in accordance with standard practice a thin layer of a mixture of magnesite and basic open hearth slag is placed on the bottom and fired at a temperature of 2800° F. or above. The slag and magnesite mixture sinters and fills the interstices resulting from the shrinkage previously mentioned. The furnace is then ready for use.

A principal object of this invention, therefore, is to produce a magnesite bottom free of such cracks as will develop in a rammed material as described above, although other objects, purposes and advantages of the invention will appear in subsequent portions of the specification and in the appended claims.

Magnesia in its purest forms is expensive and does not sinter together readily, so commercial magnesites containing a bond, for example, those known by the trade-names of "Magnamix," "Magnahearth" and "Ramset" may be used in the practice of my invention. Without such bonds these magnesites would not sinter and would be granular even after heating to high temperatures. Such commercial magnesites will average from about 65 to 80 per cent magnesia, about 8 to 10 per cent silica, and about 3 per cent ferric oxide, with smaller amounts of alumina and other residual impurities. Such commercial magnesites, as purchased, will contain from 0.2 to 5.0% of a bonding agent such as sodium silicate, clay, borax or slag.

I have found that by adding certain ferro-alloys which oxidize and expand during firing, the shrinkage of such a magnesite refractory composition can be controlled or eliminated, or the refractory composition can even be made to expand, depending upon the kind and amount of the added alloy. Thus, mixtures of "Magnamix" with 5 per cent to 20 per cent additions, by weight, of ferrochrome and/or ferrovanadium will show either no shrinkage or moderate expansion (2 per cent to 7 per cent) on firing, in decided contrast to the large shrinkage of the original material alone. If fact, the refractoriness of the ramming material is improved and there is no shrinkage in a mixture containing 10 per cent to 12 per cent ferrochrome.

In making an open hearth furnace bottom in accordance with my invention the above mixture containing magnesite, a bonding agent, and from 5 to 20 per cent of ferrochrome or ferrovanadium, is tamped into place to the desired thickness and is then fired at a temperature of from 2600 to 3000° F., as in the normal practice prior to my invention. However the firing of this mixture does not result in any shrinkage of the furnace bottom, for the reason that the ferrochrome or ferrovanadium expands upon oxidation and thereby compensates for the shrinkage of the magnesite.

After firing as above set forth, it is desirable to spread over the furnace botttom a thin layer of magnesite and basic open hearth slag and to fire this at a temperature of say 2900° F. This material fuses and fills in the pores or interstices in the bottom material.

The ferrochrome I have used normally contains about 67 per cent to 71 per cent chromium, and the ferrovanadium about 35 per cent to 45 per cent vanadium, the remainders of both being mostly iron.

Petrographic and X-ray studies show that the final reaction products of the magnesia and the ferro-alloys are magnesio-spinels and iron-soaked periclase. With ferrochrome the spinels are magnesioferrite and magnesiochromite. The corresponding end products with ferrovanadium are magnesioferrite and a magnesium vanadate, probably $Mg_3V_2O_8$.

Calculations based on the observed products and density data obtained from the literature indicate that the oxidation of the chromium (or vanadium) and the iron account for the greater part of the expansion employed to counteract the tendency of the magnesite to shrink on firing. Additional but minor expansion occurs when these metal oxides react with the magnesia. Both of these operations probably take place concurrently.

In addition to being beneficial as a means of controlling shrinkage, the $Cr_2O_3$ and $V_2O_5$ which develop on oxidation act to prevent the inversion of dicalcium silicate derived from lime in the slags and thereby stabilize the bottom from "dusting"—the disintegration of the bottom into a fine dust—which otherwise often develops in periods when the furnace is idle and cold.

As chrome oxide is a good refractory, and as iron oxide in moderate amounts has almost negligible effect on the refractoriness of magnesite, the addition of up to 20 per cent ferrochrome to a magnesite bottom is not detrimental to its refractoriness.

I claim:

1. The method of forming a basic open hearth furnace bottom which comprises tamping in place a layer of magnesite containing a bonding agent and from 5 to 20 per cent of ferrochromium, and thereafter heating the said layer to a temperature in excess of 2600° F. to fuse the said layer and oxidize the ferrochromium therein, whereby to form a monolithic furnace bottom free from shrinkage cracks.

2. The method of forming a monolithic basic furnace bottom substantially free from shrinkage cracks which consists in tamping in place cold a layer of magnesite containing a bonding agent and from 5 to 20 per cent of a metal of the group consisting of ferrochromium and ferrovanadium and thereafter heating said layer to a temperature of 2800° F.

References Cited in the file of this patent

UNITED STATES PATENTS

| | | |
|---|---|---|
| Re. 22,050 | Crespi | Mar. 24, 1942 |
| 1,790,918 | Hauser | Feb. 3, 1931 |
| 1,911,189 | Harris | May 30, 1933 |
| 2,088,981 | Sturgis | Aug. 3, 1937 |
| 2,358,652 | Nicholas | Sept. 19, 1944 |
| 2,431,660 | Gaudenzi | Nov. 25, 1947 |
| 2,439,570 | Hensel et al. | Apr. 13, 1948 |
| 2,504,185 | Debenham | Apr. 18, 1950 |
| 2,571,134 | Hicks | Oct. 16, 1951 |